(12) United States Patent
Koizumi

(10) Patent No.: US 11,404,084 B2
(45) Date of Patent: Aug. 2, 2022

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Gaku Koizumi, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/162,211

(22) Filed: Jan. 29, 2021

(65) Prior Publication Data

US 2022/0084551 A1    Mar. 17, 2022

(30) Foreign Application Priority Data

Sep. 17, 2020  (JP) .............. JP2020-156400

(51) Int. Cl.
*G11B 5/127*   (2006.01)
*G11B 17/34*   (2006.01)
*G11B 5/012*   (2006.01)
*G11B 5/09*    (2006.01)

(52) U.S. Cl.
CPC .............. *G11B 17/34* (2013.01); *G11B 5/012* (2013.01); *G11B 5/09* (2013.01)

(58) Field of Classification Search
None
See application file for complete search history.

(56) References Cited

U.S. PATENT DOCUMENTS

| | | | | |
|---|---|---|---|---|
| 4,056,831 A | * | 11/1977 | Godbout | G11B 5/59627 360/77.02 |
| 4,811,133 A | * | 3/1989 | Nakadai | G11B 5/5556 318/592 |
| 9,741,379 B1 | * | 8/2017 | Hanson | G11B 5/556 |
| 10,504,543 B1 | * | 12/2019 | Koizumi | G11B 5/1278 |
| 10,910,007 B1 | * | 2/2021 | Trinh | G11B 5/607 |
| 2003/0123182 A1 | * | 7/2003 | Inaji | G11B 21/106 360/78.04 |

(Continued)

FOREIGN PATENT DOCUMENTS

| | | |
|---|---|---|
| JP | 2010-9671 A | 1/2010 |
| JP | 2012-14792 A | 1/2012 |
| JP | 2014-86122 A | 5/2014 |

*Primary Examiner* — Peter Vincent Agustin
(74) *Attorney, Agent, or Firm* — Allen & Overy LLP

(57) ABSTRACT

According to one embodiment, a magnetic disk device includes a magnetic disk, a magnetic head configured to write data on the magnetic disk, an assist section configured to assist, when the magnetic head writes data on the magnetic disk, write of the data by utilizing an assist element, a voltage control section configured to control a voltage to be applied to the assist element, and a positioning control section configured to carry out positioning of the magnetic head relatively to the magnetic disk on the basis of servo data and acquire positional error data of the magnetic head positioned on the basis of the servo data. The voltage control section adjusts the voltage to be applied to the assist element on the basis of the positional error data.

9 Claims, 13 Drawing Sheets

(56) References Cited

U.S. PATENT DOCUMENTS

| | | | |
|---|---|---|---|
| 2004/0027709 A1* | 2/2004 | Hamaguchi | G11B 5/127 360/59 |
| 2007/0268615 A1* | 11/2007 | McFadyen | G11B 5/607 360/75 |
| 2008/0316636 A1* | 12/2008 | Kuwahara | G11B 5/607 360/75 |
| 2011/0043942 A1* | 2/2011 | Ono | G11B 5/6064 360/59 |
| 2013/0163111 A1* | 6/2013 | Albrecht | G11B 5/596 360/75 |
| 2013/0335847 A1* | 12/2013 | Shiroishi | G11B 5/02 360/46 |
| 2014/0118861 A1 | 5/2014 | Funayama | |
| 2015/0103437 A1 | 4/2015 | Watanabe et al. | |
| 2019/0279668 A1 | 9/2019 | Freitag et al. | |
| 2020/0286507 A1* | 9/2020 | Wu | G11B 5/3146 |
| 2021/0256996 A1* | 8/2021 | Ohtake | G11B 5/012 |

\* cited by examiner

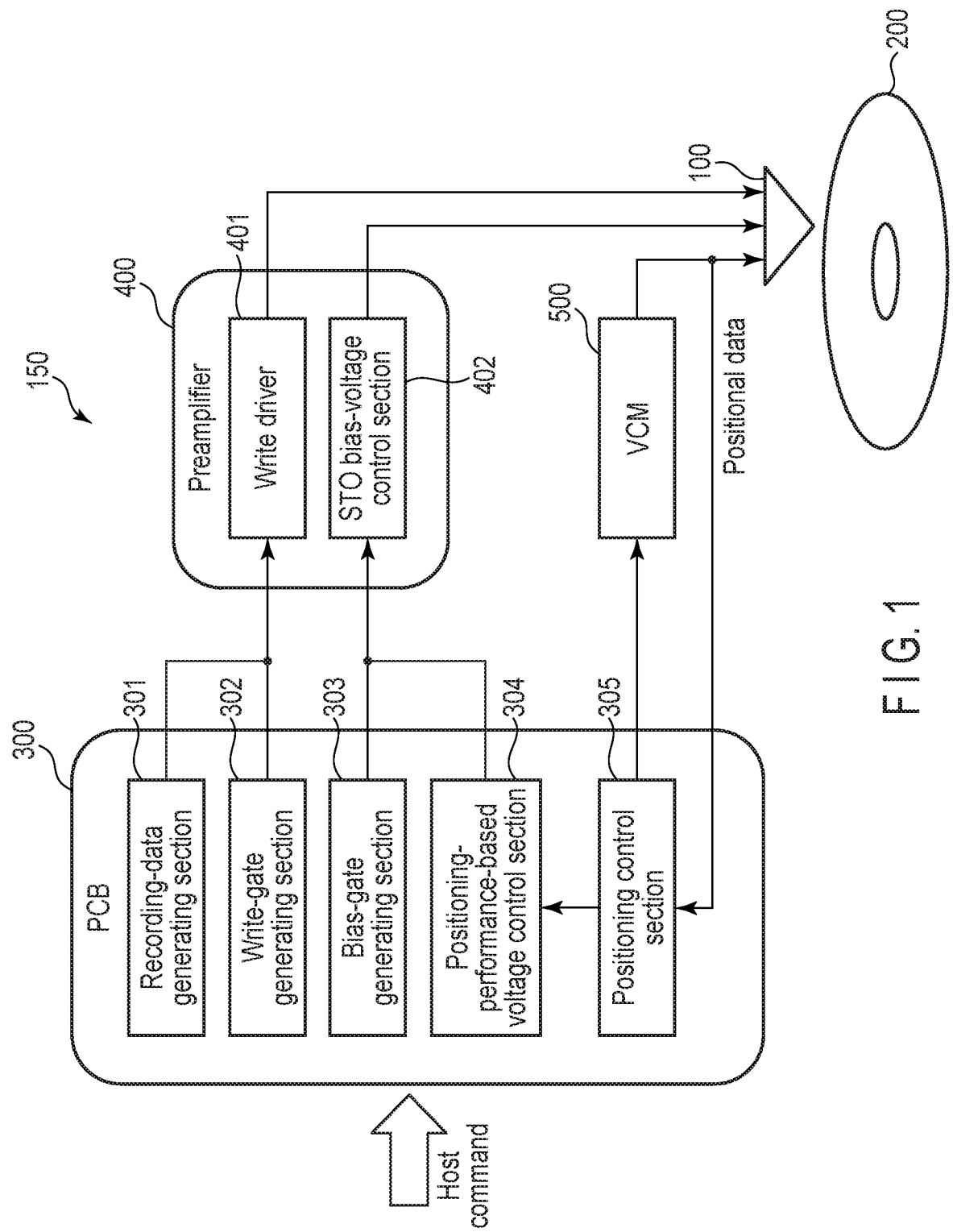
F I G. 1

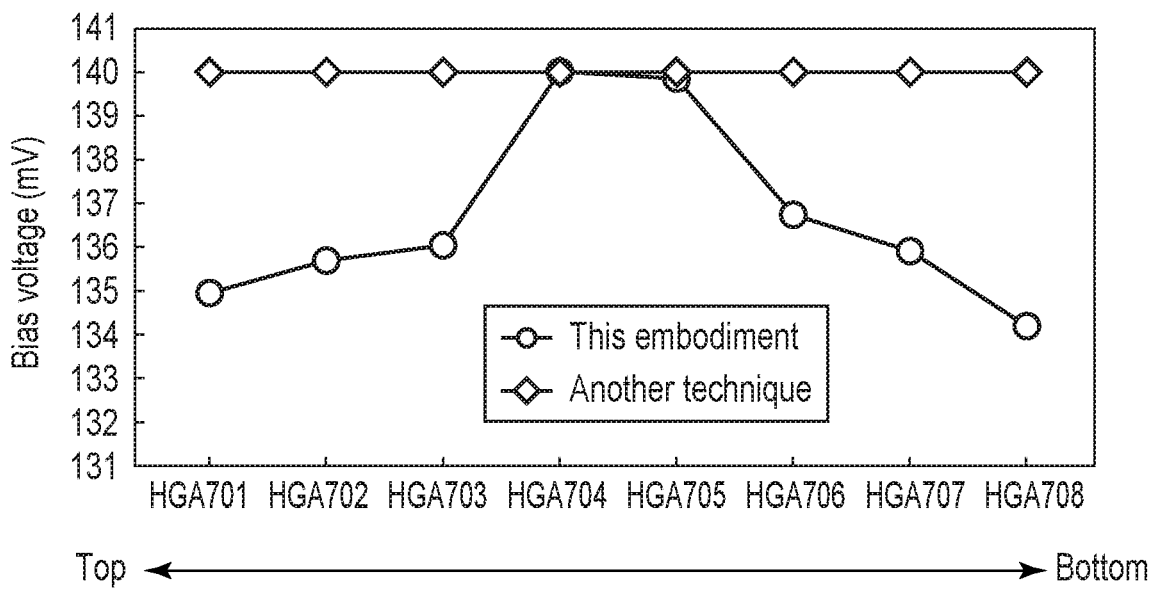
F I G. 12
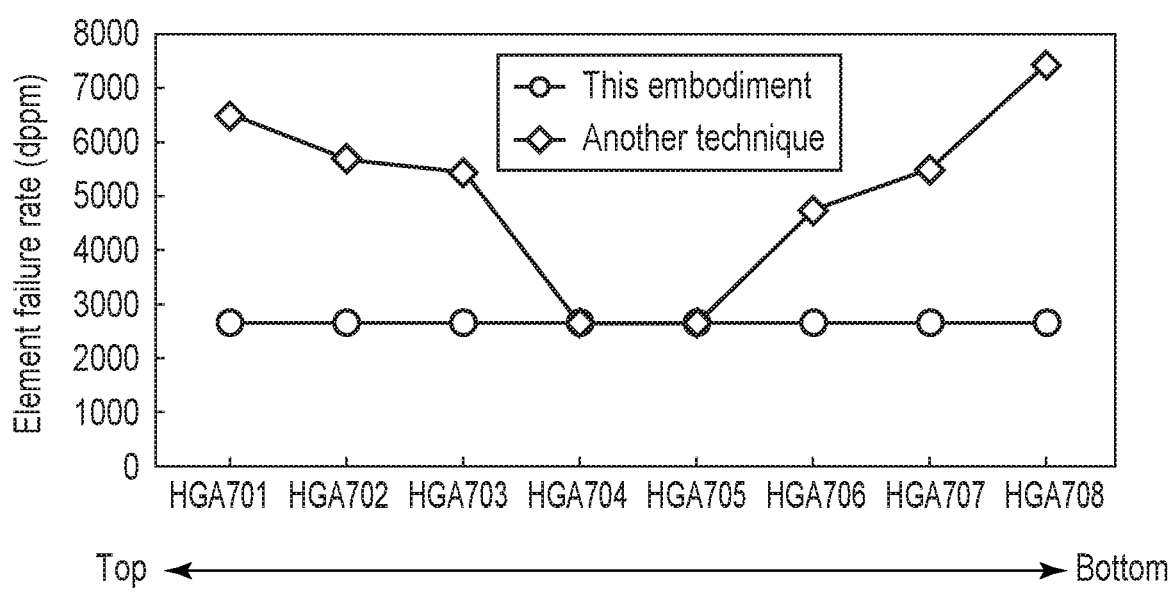
F I G. 13

MAGNETIC DISK DEVICE

CROSS-REFERENCE TO RELATED APPLICATIONS

This application is based upon and claims the benefit of priority from Japanese Patent Application No. 2020-156400, filed Sep. 17, 2020, the entire contents of which are incorporated herein by reference.

FIELD

Embodiments described herein relate generally to a magnetic disk device.

BACKGROUND

A magnetic disk device in which the accuracy of recording is improved by utilizing an assist element at the time of carrying out data recording is known.

In a magnetic disk device, in the case of a magnetic head inferior in servo-positioning quality at the time when disturbance vibration is applied thereto, the write-retry frequency at the time of application of a disturbance becomes higher. Thereby, in the magnetic disk device, a state where the length of time for which a voltage is applied to the assist element, for example, a high-frequency element becomes longer relatively to the actual write data length occurs. When such a state occurs, the progress of deterioration of the assist element is accelerated.

Embodiments described herein aim to provide a magnetic disk device which avoids a harmful influence on the assist element and reduces the failure frequency of the assist element.

BRIEF DESCRIPTION OF THE DRAWINGS

FIG. 1 is a view showing an example of a control block of a magnetic disk device according to a first embodiment.

FIG. 12 is a view showing an example of a bias voltage to be applied to an STO element corresponding to the position at which each of the head gimbal assemblies according to the second embodiment is provided.

FIG. 13 is a view showing an example of an element failure rate of an STO element corresponding to the position at which each of the head gimbal assemblies according to the second embodiment is provided.

DETAILED DESCRIPTION

Figure 2:
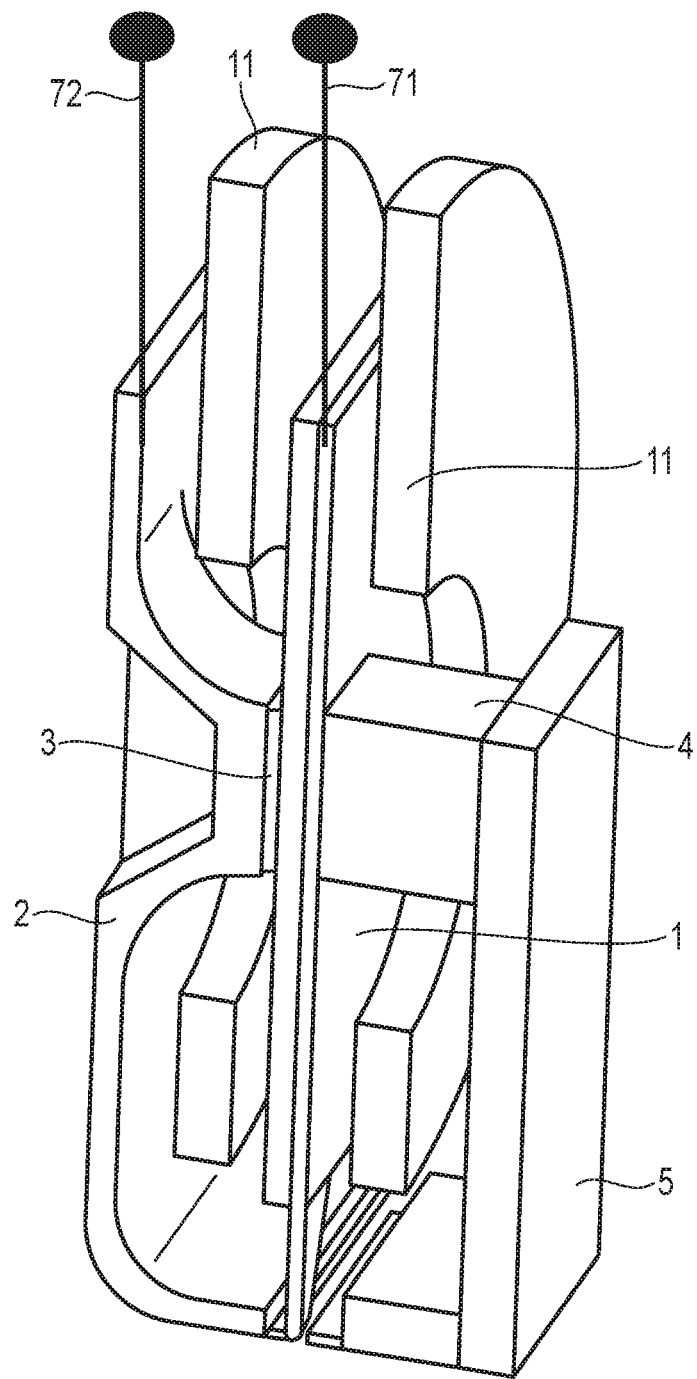
FIG. 2 is a perspective view showing an example of a track center cross section of a recording head section of a magnetic head according to the first embodiment.

In general, according to one embodiment, a magnetic disk device includes a magnetic disk, a magnetic head configured to write data on the magnetic disk, an assist section configured to assist, when the magnetic head writes data on the magnetic disk, write of the data by utilizing an assist element, a voltage control section configured to control a voltage to be applied to the assist element, and a positioning control section configured to carry out positioning of the magnetic head relatively to the magnetic disk on the basis of servo data and acquire positional error data of the magnetic head positioned on the basis of the servo data. The voltage control section adjusts the voltage to be applied to the assist element on the basis of the positional error data.

Embodiments are explained below with reference to the drawings. Note that disclosure is only an example. The invention is not limited by content described in the following embodiments. Modifications easily conceived by those skilled in the art are naturally included in the scope of the present disclosure. To further clarify the explanation, sizes, shapes, and the like of portions are sometimes changed from those in actual implementation forms and schematically shown in the drawings. In a plurality of drawings, the same reference numbers are sometimes added to elements corresponding thereto and detailed explanation of the portions is omitted.

First Embodiment

FIG. 1 is a view showing an example of a control block of a magnetic disk device 150. It should be noted that in this embodiment, a technique relating to write of data is to be described, and hence the configuration and processing relating to write of data will mainly be described and detailed descriptions of the configuration and processing relating to read of data will be omitted.

As shown in FIG. 1, the magnetic disk device 150 includes a magnetic head 100, magnetic disk 200, printed-circuit board (PCB) 300, preamplifier 400, and voice coil motor (VCM) 500.

The magnetic head 100 carries out read/write of data from/to the magnetic disk 200. Details of the magnetic head 100 will be described later with reference to FIG. 2 and FIG. 3. The magnetic head 100 includes an assist element 10 (see FIG. 3) configured to assist write of data in addition to a read head and write head. In this embodiment, the magnetic head 100 includes an STO (spin-torque oscillator: high-frequency) element 10 as the assist element. That is, the magnetic head 100 includes a high-frequency assist section configured to assist write of data by using the STO element 10.

The magnetic disk 200 includes a substrate formed into a disk-like shape and constituted of a nonmagnetic substance. In each of the surfaces of the substrate, a soft magnetic material layer functioning as a foundation layer and constituted of a material exhibiting soft magnetic characteristics, magnetic recording layer formed on the soft magnetic material layer and having magnetic anisotropy in the direction perpendicular to the disk surface, and protective film layer formed on the magnetic recording layer are stacked on top of each other in the order mentioned. By virtue of such a configuration, the magnetic disk 200 is enabled to record/retain data.

The printed-circuit board 300 is a one-chip integrated circuit in which an R/W channel configured to control read/write of data, hard disk controller constituting an interface with the host, and main control section configured to control each section in the magnetic disk device 150 are incorporated. In this embodiment, the printed-circuit board 300 includes, by means of these hardware members, the following functional blocks of a recording-data generating section 301, write-gate generating section 302, bias-gate generating section 303, positioning-performance-based voltage control section 304, and positioning control section 305.

The recording-data generating section 301 generates a write signal of data to be recorded on the magnetic disk 200. The write-gate generating section 302 generates a write-gate signal for turning on the gate at such timing that data is recorded. The write signal of the recording-data generating section 301 and write-gate signal of the write-gate generating section 302 are supplied to the preamplifier 400. The bias-gate generating section 303 generates a bias-gate signal for turning on the gate at such timing that write of data is carried out by using the STO element 10. The positioning-performance-based voltage control section 304 determines the magnitude of a voltage to be applied to the STO element for each of the positioning performance items of the magnetic head 100. Here, the positioning performance is determined on the basis of positional error data to be supplied from the positioning control section 305. The bias-gate signal generated by the bias-gate generating section 303 and magnitude of the voltage determined by the positioning-performance-based voltage control section 304 are supplied to the preamplifier 400.

The positioning control section 305 carries out positioning of the magnetic head 100 relative to the magnetic disk 200 on the basis of servo data read from the magnetic disk 200 and acquires positional error data (PES) of the magnetic head positioned on the basis of the servo data. More specifically, the positioning control section 305 supplies a positioning signal based on the servo data to the voice coil motor 500. Thereby, the voice coil motor 500 operates and magnetic head 100 is positioned to the desired position. Further, the positioning control section 305 calculates the amount by which the position of the magnetic head 100 positioned in the manner described above deviates from the desired position, i.e., positional error data indicating the positional error on the basis of the position indicated by the positioning signal and actual position of the magnetic head 100 indicated by the positional data to be transmitted from the magnetic head 100. Furthermore, the positioning control section 305 supplies the calculated positional error data to the positioning-performance-based voltage control section 304.

The preamplifier 400 supplies a write signal to the write head of the magnetic head 100 and carries out write of data to the magnetic disk 200. Further, the preamplifier 400 amplifies data read by the read head of the magnetic head 100 and outputs amplified data to the printed-circuit board 300. The preamplifier 400 includes a write driver 401 and STO bias-voltage control section 402.

The write driver 401 supplies a write signal to the write head of the magnetic head 100 on the basis of a write signal to be supplied from the recording-data generating section 301 and write-gate signal generated by the write-gate generating section 302. Thereby, data is recorded on the magnetic disk 200. The STO bias-voltage control section 402 controls the voltage to be applied to the STO element 10 on the basis of a bias-gate signal generated by the bias-gate generating section 303 and magnitude of the voltage to be supplied from the positioning-performance-based voltage control section 304. Thereby, write of data is assisted.

The voice coil motor 500 carries out positioning of the magnetic head 100 on the basis of a positioning signal to be supplied from the positioning control section 305. Further, positional data indicating the current position of the magnetic head 100 is output from the magnetic head 100 to the positioning control section 305.

In the magnetic disk device 150 having the configuration previously described above, when a write command to record data is issued by the host and the host command is received by the magnetic disk device 150, a recording current is made to flow from the write driver 401 in the preamplifier 400 to the magnetic head 100 on the basis of the write data from the recording-data generating section 301 in the printed-circuit board 300 and write-gate signal from the write-gate generating section 302, and data is recorded on the magnetic disk 200. Further, regarding the bias voltage to be applied to the STO element 10 too, a current is made to flow through the magnetic head 100 by the STO bias-voltage control section 402 on the basis of the bias-gate signal for determining the bias-application timing and assist recording is carried out at the time of data write. At this time, the positioning-performance-based voltage control section 304 adjusts the magnitude of the voltage of the STO bias-voltage control section 402 as the need arises on the basis of the positional error data to be transmitted from the positioning control section 305. Here, regarding the range of voltage adjustment, when the voltage to be applied to the STO element 10 of the magnetic head 10 in which the variance value of the positional error data is the smallest is set as a first voltage, and the voltage to be applied to the STO element 10 of the magnetic head 10 in which the variance value of the positional error data is the largest is set as a second voltage, it is desirable that the positioning-performance-based voltage control section 304 should adjust the voltage to be applied to the STO element 10 in such a manner that the first voltage becomes greater than or equal to the second voltage.

Figure 3:
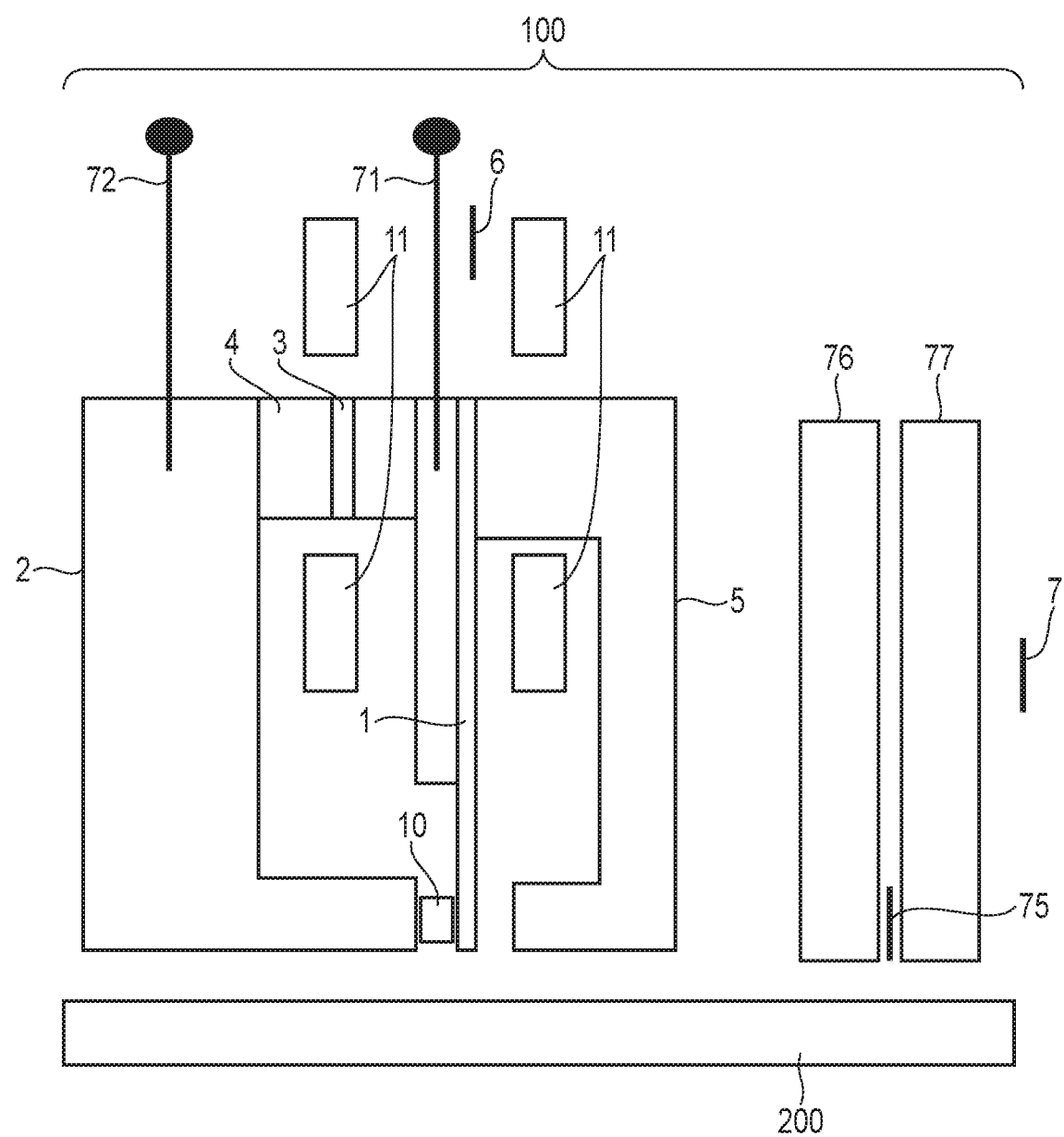
FIG. 3 is a cross-sectional view showing an example of each of the recording head section of the magnetic head and magnetic disk according to the first embodiment.

FIG. 2 is a perspective view showing an example of a track center cross section of the recording head section of the magnetic head 100. Further, FIG. 3 is a cross-sectional view showing an example of each of the recording head section of the magnetic head 100 and magnetic disk 200.

The magnetic disk 200 of this embodiment is, as described previously, a vertical recording medium including a recording layer having anisotropy in the direction perpendicular to the disk surface. The magnetic head 100 is a separated type magnetic head in which the recording head and reproducing head are separated from each other. The recording head section is constituted of a main pole 1 formed of a high magnetic permeability material, return magnetic pole 2 provided in order to efficiently close the magnetic path through a soft magnetic material layer immediately under the main pole of the perpendicular head arranged on the trailing side of the main pole 1, recording head coils 11 arranged in such a manner as to be wound around the magnetic path including the main pole and return magnetic pole 2 for the purpose of making the magnetic flux flow through the main pole 1, and STO element 10 serving as an assist element arranged in such a manner as to be interposed between the return magnetic pole 2 and main pole 1.

To the main pole 1, a first terminal 71 is connected, and to the return magnetic pole 2, a second terminal 72 is connected. The two recording head coils 11 are wound in directions opposite to each other, and an AC current flows through each of the recording head coils 11, whereby the main pole 1 is excited. Further, in order to control the floating amount of magnetic head 100 relative to the recording surface of the magnetic disk 200 at the time of recording/reproduction, a first heater 6 and first reader 75 arranged on the depth side of the recording element section, and second heater 7 arranged on the depth side of the reproducing element section having shield films 76 and 77 of the first reader 75 are provided. It should be noted that in FIG. 3, although only the first reader 75 is shown, a second reader may also be provided at a predetermined position in the page direction. Further, the magnetic head 100 includes a non-conductor 3, joint section 4, and reading magnetic pole 5.

Figure 4:
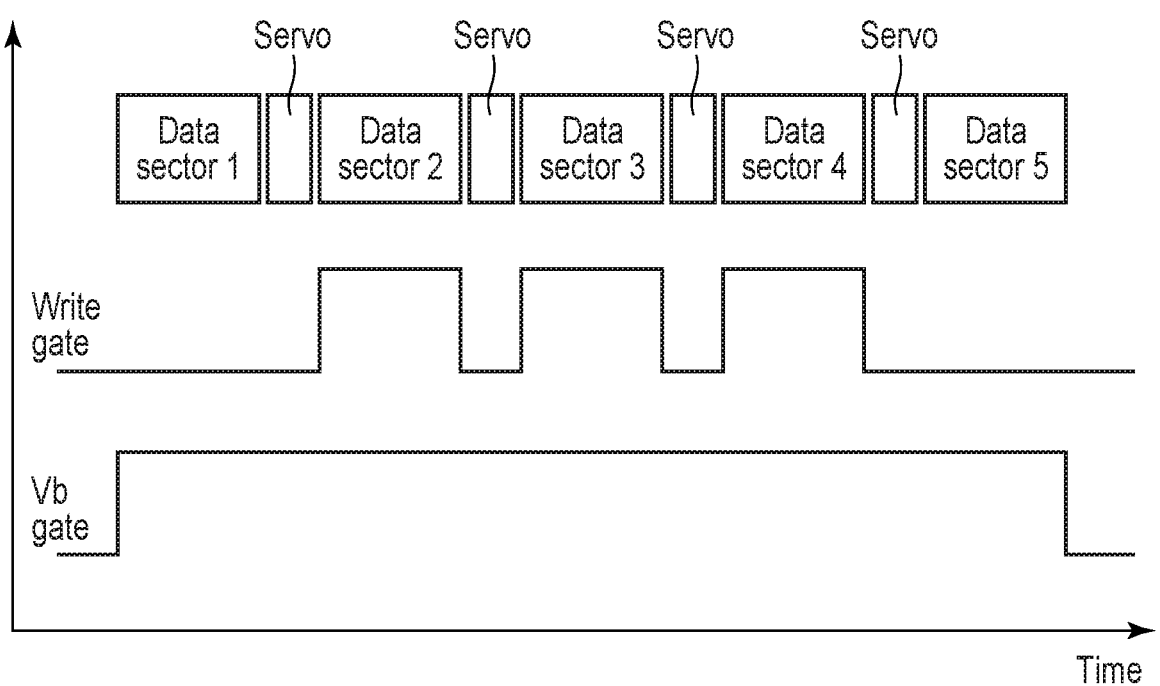
FIG. 4 is a view showing an example of a timing chart at the time when data is written while a bias voltage is actually applied in the case where an STO element is used as the assist element according to the first embodiment.

FIG. 4 is view showing an example of a timing chart at the time when data is written while a bias voltage is actually applied in the case where the STO element 10 is used as the assist element.

In FIG. 4, when data is recorded in data sectors 2 to 4, a write signal rises at the corresponding timing, and write signal (write current) is passed through the magnetic head 100. Further, regarding the bias voltage of the STO element 10, in consideration of the responsiveness of the STO element 10 and length of time until the voltage value becomes stable, as shown in, for example FIG. 4, control is carried out in such a manner that the bias-gate (Vb gate) signal rises at the timing of the data sector (i.e., data sector 1) immediately before the data sector for writing and falls at the timing of the data sector (i.e., data sector 5) immediately after the completion of the write of data.

Figure 5:
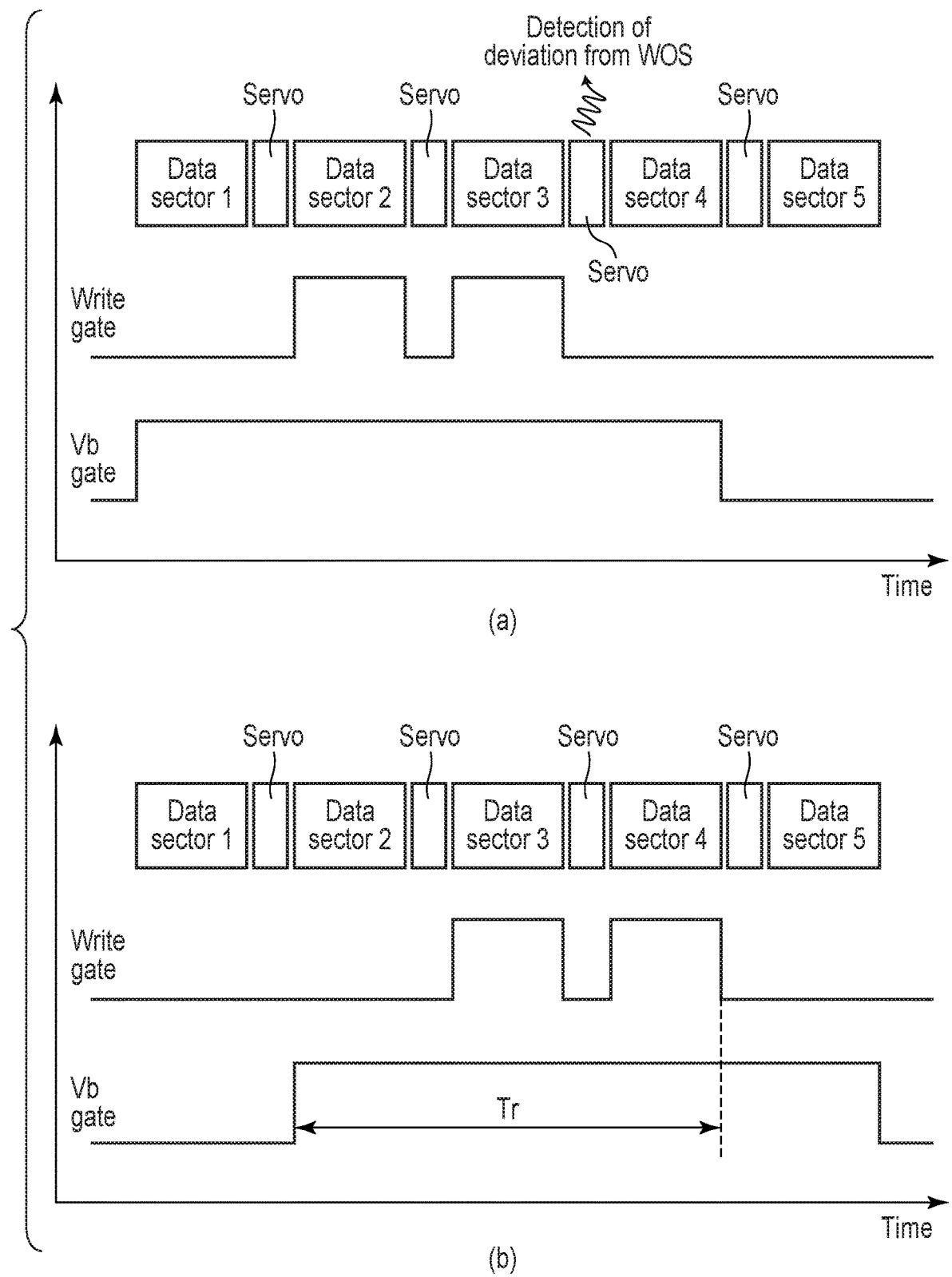
FIG. 5 is a view for explaining a retry of write according to the first embodiment.

On the other hand, there is also a case where certain disturbance vibration is applied to the magnetic disk device 150 at the time of data recording, and the position of the magnetic head 100 deviates from the desired track. In such a case, the need to retry write arises in order to guarantee the reliability of data. FIG. 5 is a view for explaining a retry of write.

As shown in FIG. 5(a), when data is to be recorded in the data sectors 2 to 4, if the positioning signal (PES) deviates from a threshold set for the purpose of preventing an adjacent track adjacent to the track for writing data from being broken, i.e., write off track slice (WOS) immediately after recording data in the data sector 3, the write-gate signal is controlled in such a manner as to immediately stop write of the data sector 4. That is, the write-gate signal supplied from the write-gate generating section 302 falls and write of data is stopped.

Subsequently, as shown in FIG. 5(b), after waiting for the rotation of the magnetic disk 200, the operation of recording data in the remaining data sector 4 is resumed anew. However, there is a possibility that the data sector 3 in which the deviation from the WOS has been detected last time has not been properly subjected to data write. For this reason, the magnetic disk device 150 carries out control in such a manner as to record data in the data sector 3 in addition to the data sector 4. At this time, regarding the bias voltage to be applied to the STO element 10, the bias-gate signal is controlled in such a manner that a margin corresponding to one data sector is held in order to secure voltage stability as has been described previously. Accordingly, when, as a result, the disturbance vibration is applied to the magnetic disk device 150, the redundant bias voltage application time indicated by Tr in FIG. 5(b) occurs to the STO element 10.

When the magnitude of the disturbance vibration is great and a retry of write is liable to be frequently exercised, the time for bias voltage application to the STO element 10 becomes longer in the magnetic disk device 150 and, as a result, the STO element 10 becomes liable to be subjected to a load.

Figure 6:
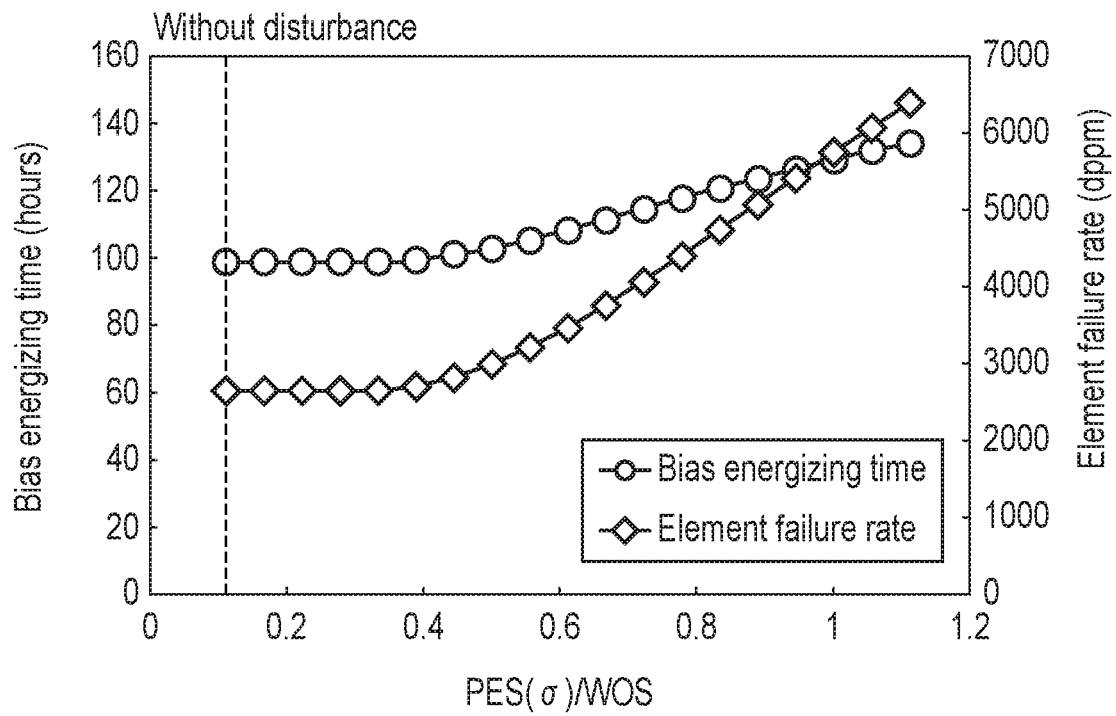
FIG. 6 is a view showing an example of a relationship between the PES($\sigma$)/WOS ratio and rate of failure making the STO element impossible to record/reproduce data due to a rupture of the STO element according to the first embodiment caused by electro-migration.

FIG. 6 is a view showing an example of a relationship between the ratio of the positional error data (PES($\sigma$)) to the WOS set to the magnetic disk device 150 and each of the bias application time for the STO element 10 being within the guarantee period (e.g., five years) and rate of failure making the STO element 10 impossible to record/reproduce data due to a rapture of the STO element 10 caused by electro-migration concomitant with long-term energization.

As shown in FIG. 6, when no great disturbance vibration is applied to the magnetic disk device 150, an influence of the increase in the voltage application time caused by the deviation from the WOS is not found. On the other hand, when the great disturbance vibration is applied to the magnetic disk device 150, and around at the time when the PES($\sigma$)/WOS ratio exceeds 0.4, the voltage application time is gradually increased and element failure rate of the STO element 10 also tends to be increased.

Figure 7:
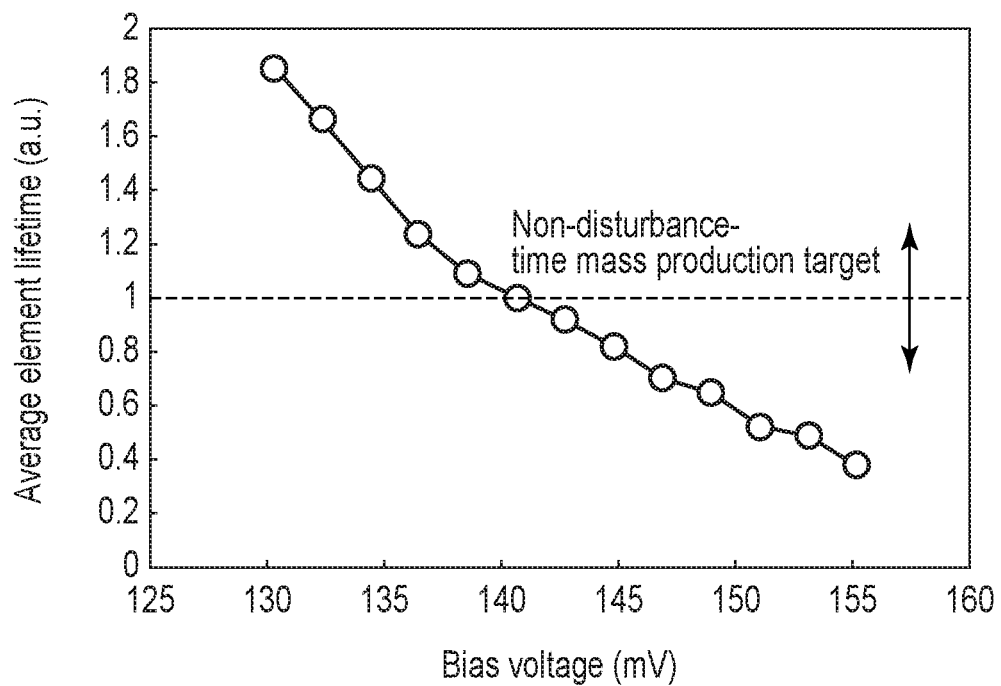
FIG. 7 is a view showing an example of a relationship between the bias voltage according to the first embodiment and average lifetime of the STO element 10.

Here, FIG. 7 is a view showing an example of a relationship between the bias voltage and average lifetime of the STO element 10.

As shown in FIG. 7, there is a fixed relationship between the bias voltage and average lifetime of the STO element 10. Thus, in this embodiment, the positioning-performance-based voltage control section 304 of the printed-circuit board 300 carries out control in such a manner as to adjust the average lifetime target and adjust the bias voltage to be set according the rate of increase in the bias application time due to the deterioration in the positioning performance on the basis of the tendency of the average element lifetime relative to the bias voltage shown in FIG. 7.

Figure 8:
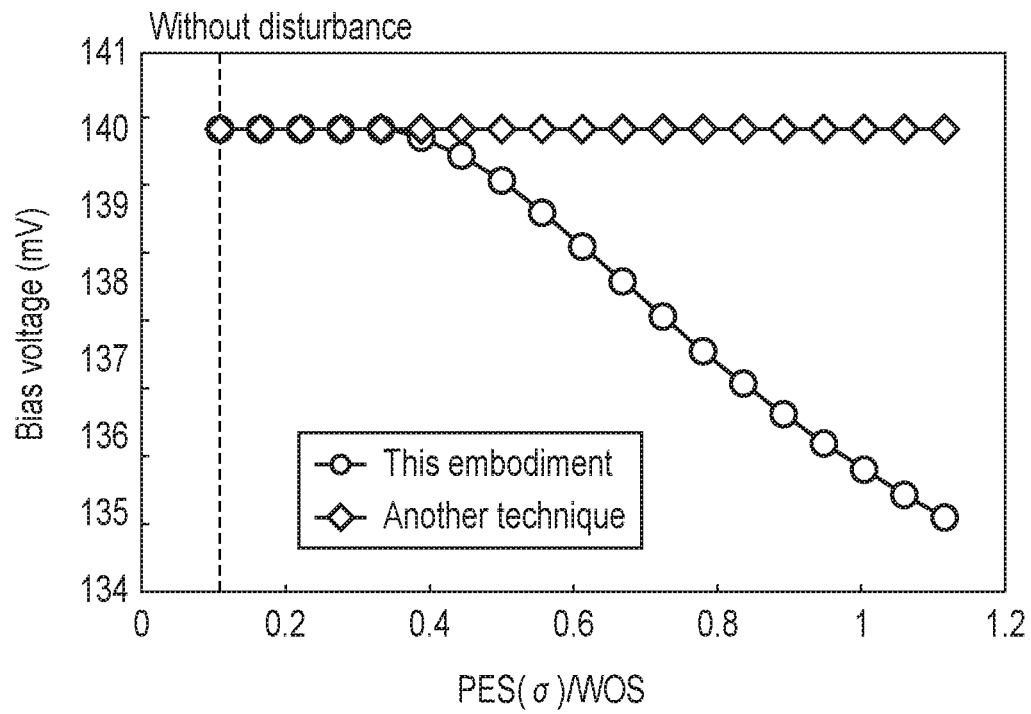
FIG. 8 is a view showing an example of an adjustment of the bias voltage (mV) to be applied to the STO element carried out according to the PES($\sigma$)/WOS ratio according to the first embodiment.

FIG. 8 is a view showing an example of an adjustment of the bias voltage (mV) to be applied to the STO element 10 carried out according to the PES($\sigma$)/WOS ratio.

As shown in FIG. 8, the PES($\sigma$)/WOS ratio shown on the left side gradually increases from the value around 0.1 without disturbance vibration. According to another technique not employing the technique of this embodiment, the bias voltage remains constant even when the PES($\sigma$)/WOS ratio increases. That is, the constant bias voltage is applied to the STO element 10 irrespective of the positioning performance at the time of disturbance vibration. Conversely, in this embodiment, the positioning-performancebased voltage control section 304 carries out adjustment in such a manner as to reduce the bias voltage to be applied to the STO element 10 with the increase in the PES(σ)/WOS ratio.

Figure 9:
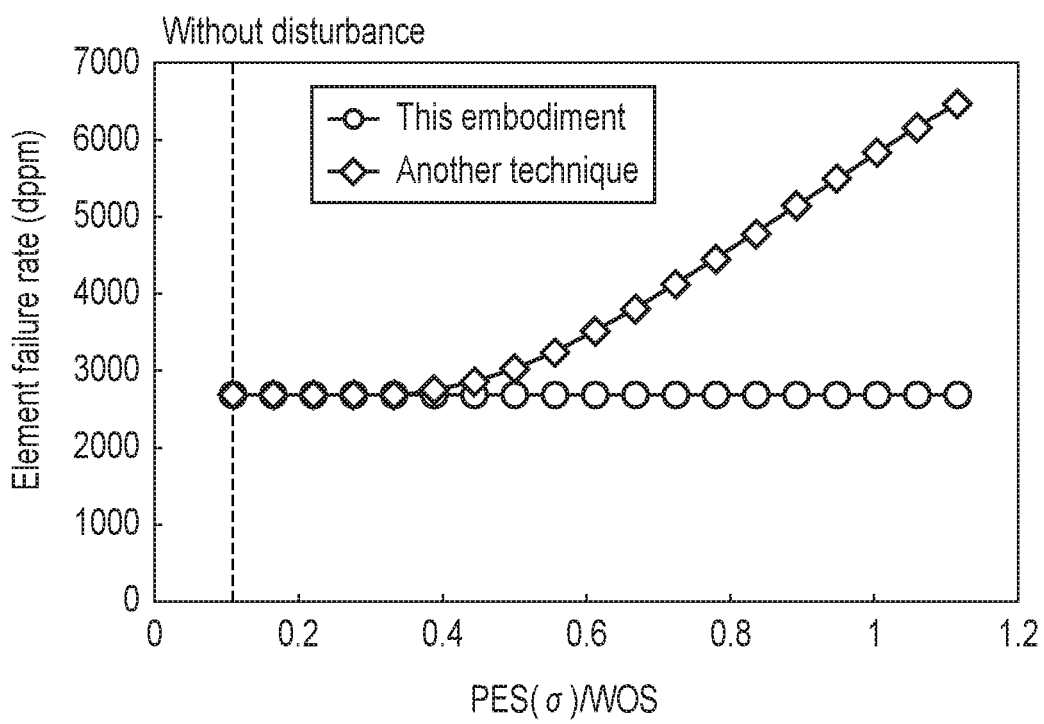
FIG. 9 is a view showing an example of an element failure rate of the STO element corresponding to the PES($\sigma$)/WOS ratio according to the first embodiment.

FIG. 9 is a view showing an example of an element failure rate (dppm) of the STO element 10 corresponding to the PES(σ)/WOS ratio.

As shown in FIG. 9, according to another technique not employing the technique of this embodiment described previously (see FIG. 8), although the failure rate of the STO element 10 is constant from the timing without the disturbance vibration at which the PES(σ)/WOS ratio shown on the left side is about 0.1 to that of about 0.4, when the value of 0.4 is exceeded and when the magnetic disk device 150 is subjected to the influence of the disturbance vibration and as the PES(σ)/WOS ratio becomes greater, the failure rate of the STO element 10 becomes greater. Conversely, in this embodiment, even as the PES(σ)/WOS ratio becomes greater, the failure rate of the STO element 10 is constant.

That is, according to this embodiment, even under the influence of the disturbance vibration, and even when the PES(σ)/WOS ratio becomes greater, the magnetic disk device 150 reduces the bias voltage to be applied to the STO element 10 by the STO bias-voltage control section 402 as the PES(σ)/WOS ratio becomes greater on the basis of the control of the positioning-performance-based voltage control section 304. Thereby, the magnetic disk device 150 can prevent the failure rate of the STO element 10 from becoming greater. Accordingly, the magnetic disk device 150 can avoid the harmful influence to be exerted on the STO element 10 and reduce the failure frequency of the STO element 10.

Second Embodiment

A second embodiment differs from the first embodiment described above in that the voltage to be applied to the STO element 10 is adjusted on the basis of the influence of the disturbance vibration occurring according to the position of a head gimbal assembly (HGA) to be incorporated into a head stack assembly (HSA) included in a magnetic disk device 150A. Accordingly, the processing of adjusting the voltage to be applied to the STO element 10 on the basis of the influence of the disturbance vibration occurring according to the position of the head gimbal assembly will be described below in detail. It should be noted that configurations identical to the first embodiment are denoted by reference symbols identical to the first embodiment and detailed descriptions of these configurations are omitted.

Figure 10:
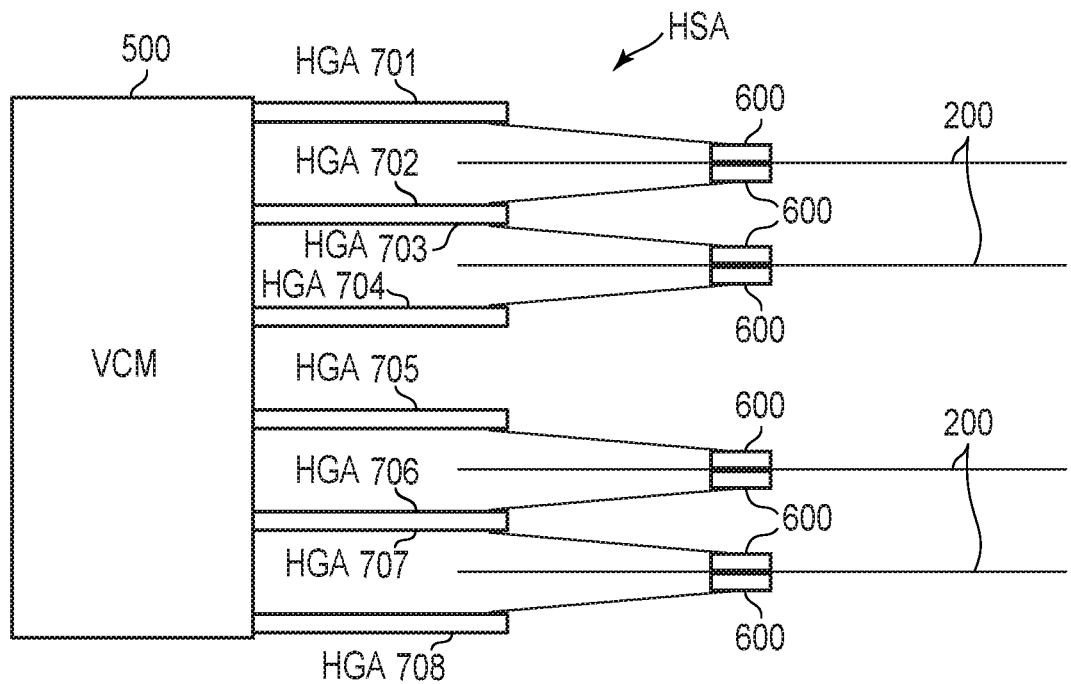
FIG. 10 is a view schematically showing an example of a cross section of a head stack assembly HSA according to a second embodiment.

FIG. 10 is a view schematically showing an example of a cross section of the head stack assembly HSA.

In FIG. 10, the head stack assembly HSA includes four magnetic disks 200, and head gimbal assemblies 701 to 708 are provided in the order mentioned in such a manner as to obtain access to both sides of each of the four magnetic disks 200. The head gimbal assembly 701 is provided on the top cover side, and head gimbal assembly 708 is provided on the bottom (base) side. Further, each of the head gimbal assemblies 701 to 708 is provided with a slider 600 including a magnetic head 100 at a tip thereof. Furthermore, each of the head gimbal assemblies 701 to 708 is controlled by the voice coil motor 500 in such a manner that the slider 600 is positioned at a predetermined position of the magnetic disk 200.

When the disturbance vibration is applied to the head stack assembly HSA configured as described above, the voice coil motor 500 itself is bent. By the influence of the bending, the positioning performance of each of the head gimbal assemblies 701 to 708 is adversely affected according to the position at which each of the head gimbal assemblies 701 to 708 is provided in the head stack assembly HSA.

Figure 11:
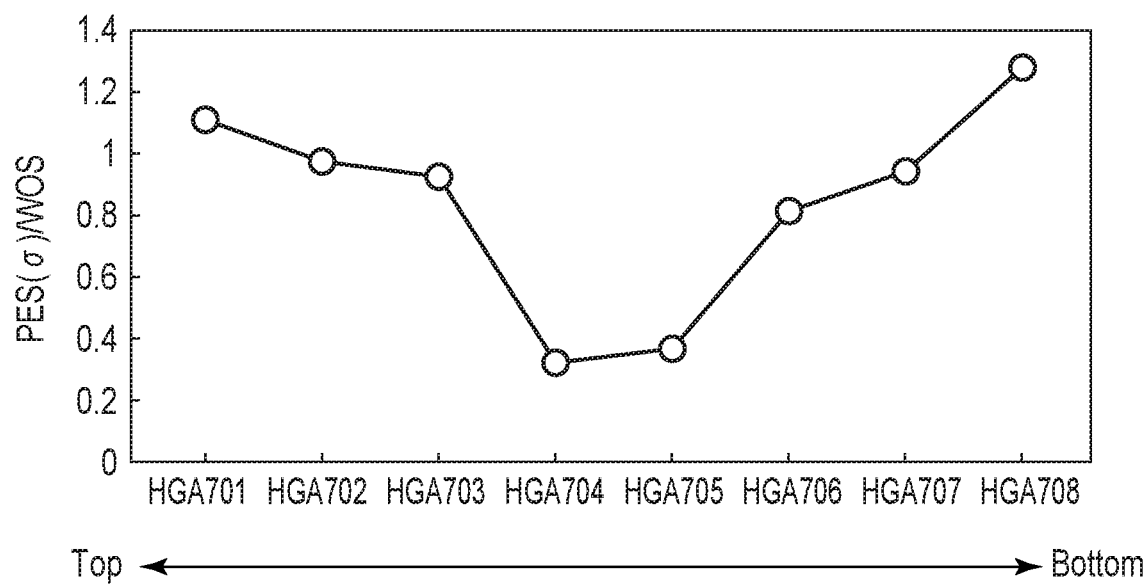
FIG. 11 is a view showing an example of the PES($\sigma$)/WOS ratio corresponding to the position at which each of head gimbal assemblies according to the second embodiment is provided.

FIG. 11 is a view showing an example of the PES(σ)/WOS ratio corresponding to the position at which each of head gimbal assemblies 701 to 708 is provided.

As shown in FIG. 11, in the head gimbal assemblies 704 and 705 close to the center of the head stack assembly HSA, the positioning performance is not comparatively deteriorated. On the other hand, the closer the position of the head gimbal assembly to the top side or the bottom side than those close to the center, the more deteriorated is the positioning performance of the head gimbal assembly. Accordingly, when the voltage to be applied to the STO element 10 is not adjusted according to the position of each of the head gimbal assemblies 701 to 708 in the head stack assembly HSA, the STO elements 10 on the top side and bottom side are made liable to be broken.

FIG. 12 is a view showing an example of a bias voltage to be applied to the STO element 10 corresponding to the position at which each of the head gimbal assemblies 701 to 708 is provided.

As shown in FIG. 12, according to another technique different from this embodiment, even when the positions at which the head gimbal assemblies 701 to 708 are provided are different from each other, the fixed bias voltage is applied to each of the STO elements 10. On the other hand, according to the technique of this embodiment, when some of the positions at which the head gimbal assemblies 701 to 708 are provided are on the top side and on the bottom side, the STO bias-voltage control section 402 carries out adjustment in such a manner as to reduce the voltage to be applied to the corresponding STO elements 10 on the basis of the control of the positioning-performance-based voltage control section 304.

FIG. 13 is a view showing an example of an element failure rate of the STO element 10 corresponding to the position at which each of the head gimbal assemblies 701 to 708 is provided.

As shown in FIG. 13, according to another technique (see FIG. 12) not employing the technique of this embodiment described previously, when some of the positions at which the head gimbal assemblies 701 to 708 are provided are on the top side and on the bottom side, the failure rates of the corresponding STO elements 10 are increased. Conversely, in this embodiment, the failure rate of each of the STO elements 10 is kept approximately constant irrespective of the position at which each of the head gimbal assemblies 701 to 708 is provided. That is, according to this embodiment, when the disturbance vibration is applied to the magnetic disk device 150, and when the positions at which some of the head gimbal assemblies 701 to 708 are provided are on the top side and on the bottom side, the positioning performance of the corresponding head gimbal assemblies is deteriorated. Even in such a case, the magnetic disk device 150 can prevent the failure rate of each of the STO elements 10 from increasing by reducing the voltage to be applied to the STO elements 10 of the head gimbal assemblies 701 to 708 provided at the positions on the top side and on the bottom side. Accordingly, the magnetic disk device 150 can avoid the harmful influence to be exerted on the STO elements 10 and reduce the failure frequencies of the STO elements 10.

Further, the positioning-performance-based voltage control section 304 may control the magnitude of the voltage to be applied to each of the STO elements 10 in the following manner. When the average value of the voltage to be applied to the STO element 10 configured to assist data write of the magnetic head 100 of the head gimbal assembly 701 closest to the top cover side and voltage to be applied to the STO element 10 configured to assist data write of the magnetic head 100 of the head gimbal assembly 708 closest to the base side is set as a third voltage, and voltage to be applied to the STO elements 10 configured to assist data write of the magnetic heads 100 of the head gimbal assemblies 702 to 707 other than the above two head gimbal assemblies 701 and 708 is set as a fourth voltage, the positioning-performance-based voltage control section 304 may adjust the magnitude of the voltage to be applied to each of the STO elements 10 by the STO bias-voltage control section 402 in such a manner that the fourth voltage becomes greater than or equal to the third voltage.

Furthermore, it is also possible to combine the technique of this embodiment with the technique of the first embodiment described previously. That is, the STO bias-voltage control section 402 reduces the bias voltage to be applied to each of the STO elements 10 as the PES(σ)/WOS ratio increases on the basis of the control of the positioning-performance-based voltage control section 304. Furthermore, the STO bias-voltage control section 402 reduces the voltage to be applied to the STO elements 10 of the head gimbal assemblies 701 to 708 provided at the positions on the top side and on the bottom side on the basis of the control of the positioning-performance-based voltage control section 304. Thereby, when the magnetic disk device 150 is affected by the disturbance vibration, the magnetic disk device 150 can avoid the harmful influence to be further exerted on the STO elements 10 and reduce the failure frequencies of the STO elements 10.

Third Embodiment

This embodiment is different from the first embodiment described previously in that the configuration assisting the data write to be carried out by the magnetic head 100 is a thermal assist section configured to carry out assist by using an optical element. Accordingly, a detailed description of the configuration and the like relating to the thermal assist section will be given below. It should be noted that configurations identical to the first embodiment are denoted by reference symbols identical to the first embodiment and detailed descriptions of these configurations will be omitted.

Figure 14:
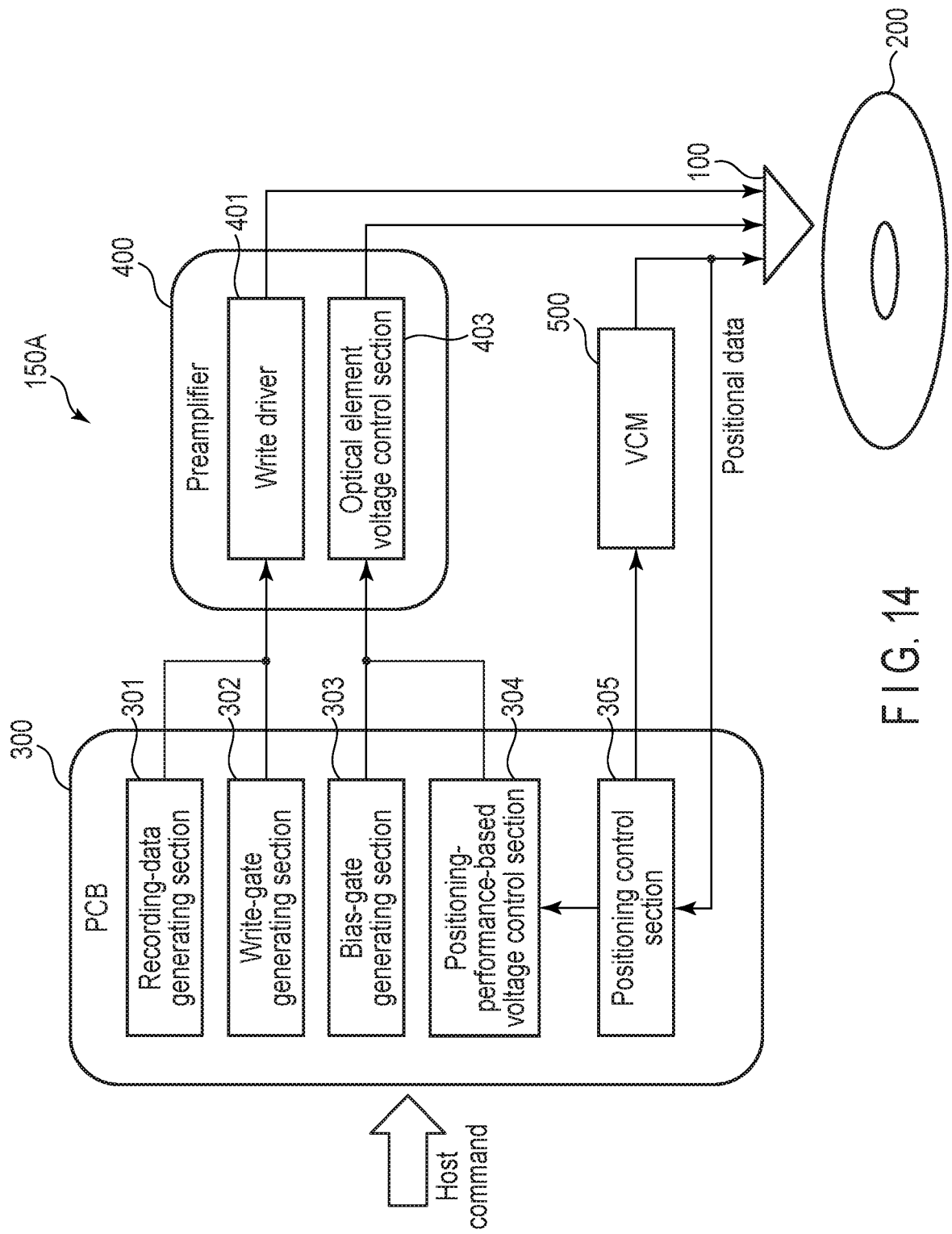
FIG. 14 is a view showing an example of a control block of a magnetic disk device according to a third embodiment.

FIG. 14 is a view showing an example of a control block of a magnetic disk device 150A. When FIG. 14 is compared with FIG. 1, an optical element voltage control section 403 is provided in place of the STO bias-voltage control section 402. The optical element voltage control section 403 controls the voltage to be applied to the optical element to be described later.

Figure 15:
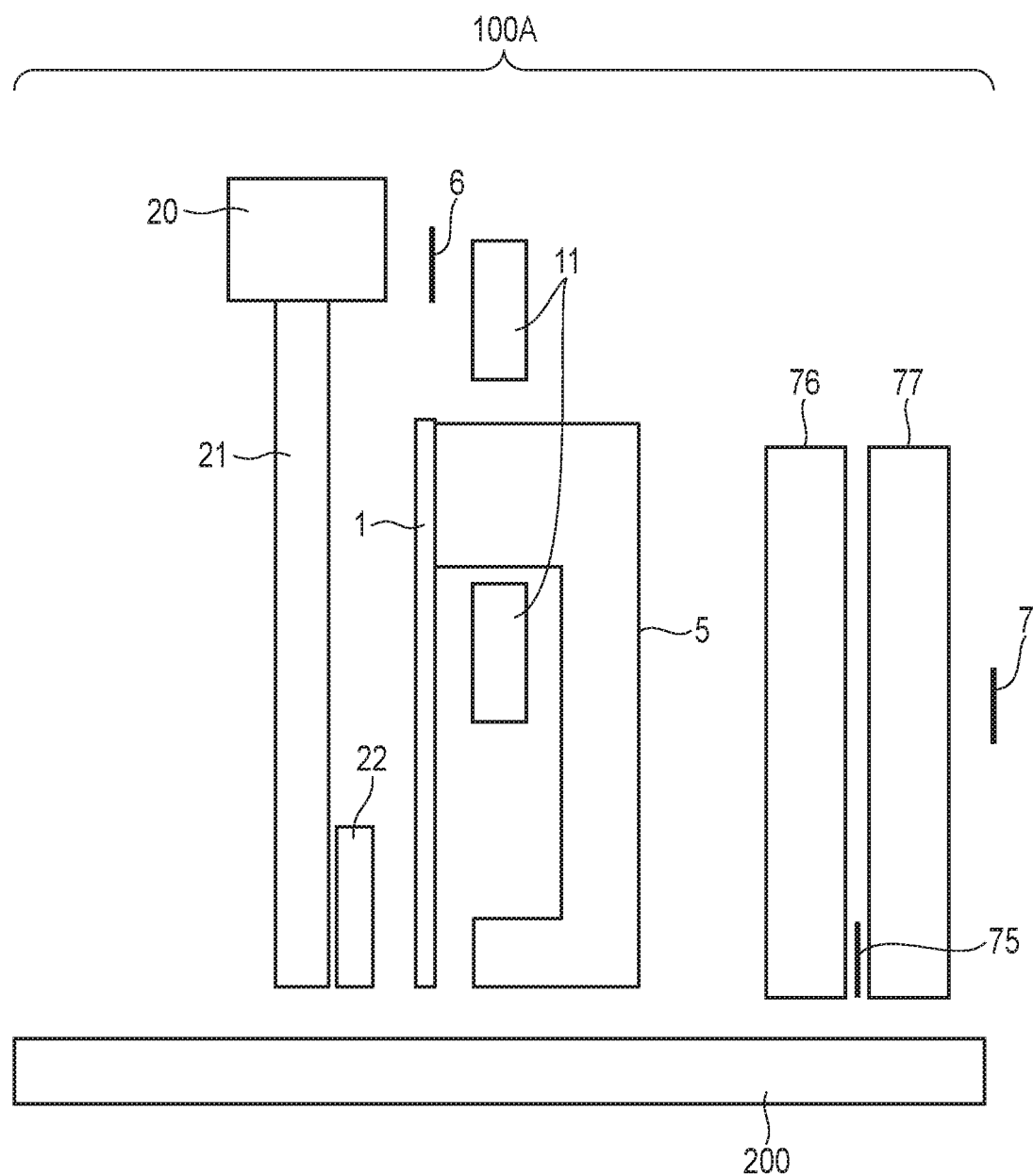
FIG. 15 is a view showing an example of the configuration of a cross section of a magnetic head including a thermal assist section according the third embodiment.

FIG. 15 is a view showing an example of the configuration of a cross section of a magnetic head 100A including a thermal assist section.

As shown in FIG. 15, when FIG. 15 is compared with the case of FIG. 3, a light source 20, light guide path 21, and optical element (near-field optical element) 22 are provided on the left side shown in FIG. 15 in place of the return magnetic pole 2, nonconductor 3, joint section 4, first terminal 71, second terminal 72, and the like. Laser light emitted from the light source 20 is guided to the optical element 22 through the light guide path 21. At this time, the configuration is contrived in such a manner that the optical element 22 operates on the basis of the voltage to be applied thereto by the optical element voltage control section 403 to thereby assist data write of the write head of the magnetic head 100.

Figure 16:
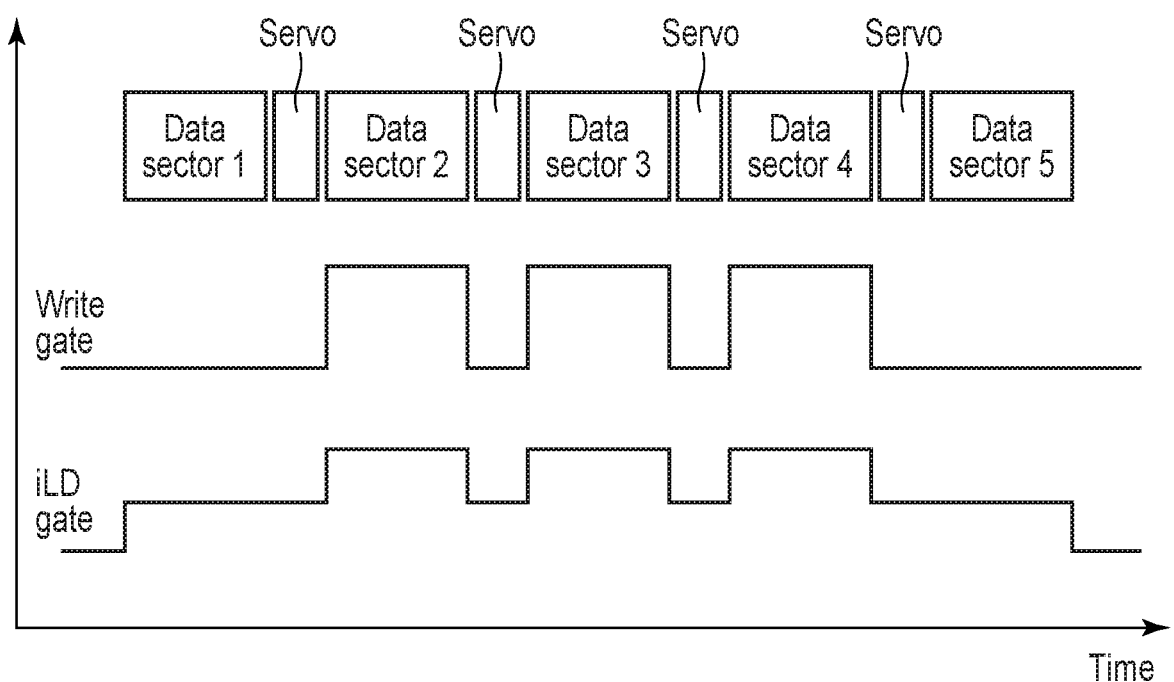
FIG. 16 is a view showing an example of a timing chart at the time when data is written while a bias voltage is actually applied in the case where an optical element is used as the assist element according to the third embodiment.

FIG. 16 is a view showing an example of a timing chart at the time when data is written while a bias voltage is actually applied in the case where the optical element 22 is used as the assist element.

In FIG. 16, when data is recorded in the data sectors 2 to 4, the write-gate signal rises at the corresponding timing, and a write signal (write current) is supplied to the magnetic head 100. Further, regarding the iLD voltage to be applied to the optical element 22, control is carried out, in consideration of the responsiveness of the optical element 22 and length of time until the voltage value becomes stable, as shown in, for example, FIG. 16, in such a manner that the bias-gate (iLD gate) signal rises to about half the necessary voltage at the timing of the data sector (i.e., data sector 1) immediately before the data sector for writing and, thereafter, processing of making the bias-gate signal further rise and then fall to about half the necessary voltage described previously at timing corresponding to each of the data sectors 2 to 4 is repeated and, after the completion of data write, the rise of the bias-gate signal to about half the necessary voltage is continued to the timing at which the time corresponding to one data sector elapses from the completion of data write (i.e., end of data sector 5), and the bias-gate signal falls at timing corresponding to the passage completion of the data sector 5.

Figure 17:
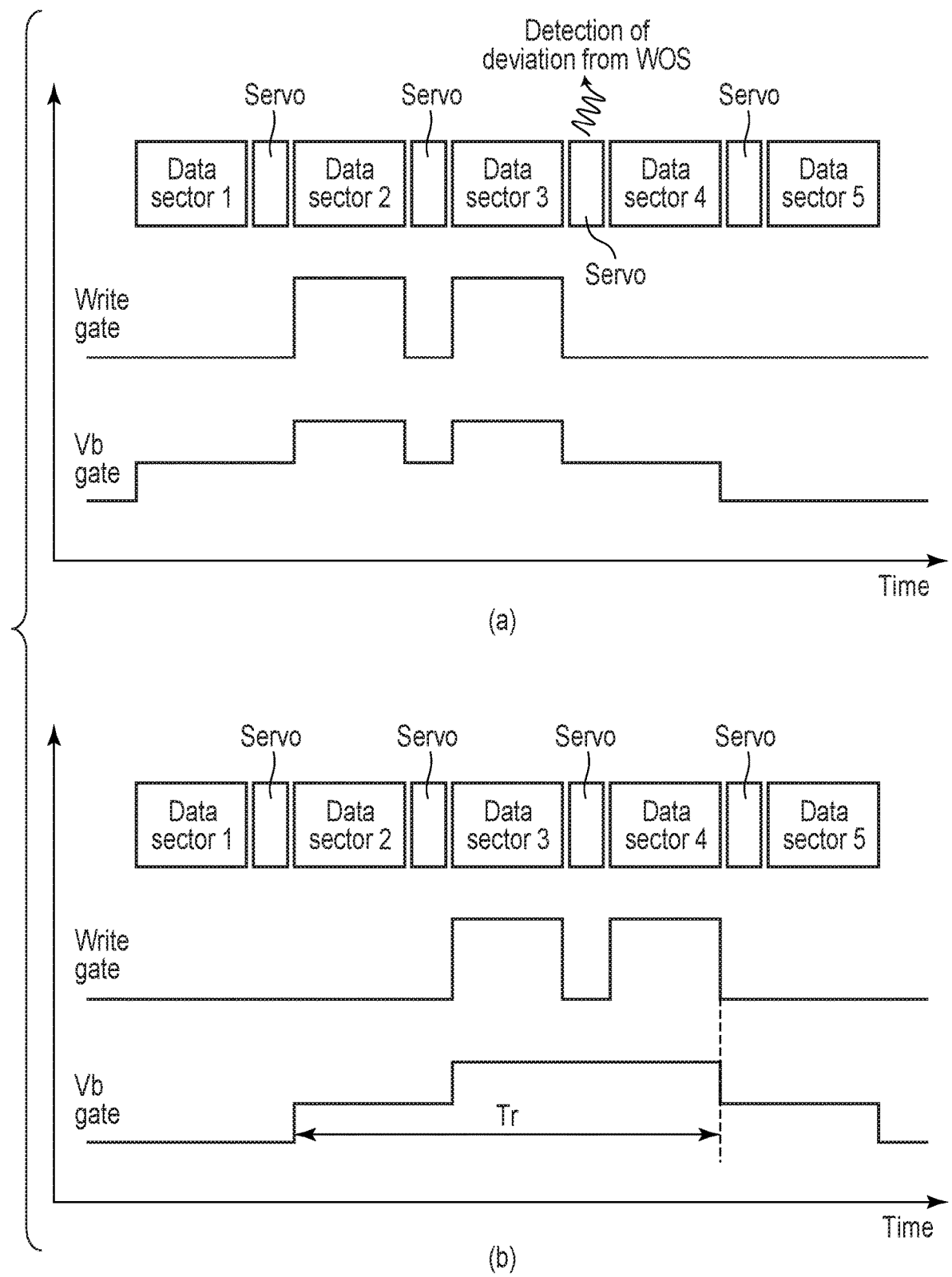
FIG. 17 is a view for explaining a retry of write according to the third embodiment.

On the other hand, there is also a case where certain vibration is applied to the magnetic disk device 150A in the course of data recording, and as in the case of the first embodiment, the position of the magnetic head 100 deviates from the desired track. In such a case, the need to retry write arises in order to guarantee the reliability of data. FIG. 17 is a view for explaining the retry of write.

As shown in FIG. 17(a), when data is to be recorded in the data sectors 2 to 4, if the positioning signal (PES) deviates from the write off track slice (WOS) set for the purpose of preventing an adjacent track from being broken immediately after recording data in the data sector 3, the write-gate signal is controlled in such a manner as to immediately stop write of the data sector 4. That is, the write-gate signal supplied from the write-gate generating section 302 falls and write of data is stopped.

Subsequently, as shown in FIG. 17(b), after waiting for the rotation of the magnetic disk 200, although the operation of recording data in the remaining data sector 4 is resumed anew, as in the case of the first embodiment, there is a possibility that in the data sector 3 in which the deviation from the WOS has been detected last time, data write has not been properly carried out. For this reason, control is carried out in such a manner as to record data in the data sector 3 in addition to the data sector 4. At this time, regarding the bias voltage to be applied to the optical element 22, the bias-gate signal is controlled in such a manner that a margin corresponding to one data sector is held in order that voltage stability can be secured as has been described previously. Accordingly, when, as a result, the disturbance vibration is applied to the magnetic disk device 150A, the redundant bias voltage application time indicated by Tr in FIG. 17(b) occurs to the optical element 22.

When the magnitude of the disturbance vibration is great and a retry of write is liable to be frequently exercised, the time for bias voltage application to the optical element 22 becomes longer in the magnetic disk device 150A and the optical element 22 becomes liable to be subjected to a load. Accordingly, even in the case of the magnetic disk device 150A using the optical element 22 as the assist element, the optical element voltage control section 403 reduces the voltage to be applied to the optical element 22 as the PES(σ)/WOS ratio becomes greater as in the case of the STO bias-voltage control section 402 described previously and/or reduces the voltage to be applied to the optical elements 22 of some of the head gimbal assemblies 701 to 708 provided at positions on the top side and on the bottom side. Thereby, when the magnetic disk device 150A is affected by the disturbance vibration, the magnetic disk device 150A can avoid the harmful influence to be exerted on the optical elements 22 and reduce the failure frequencies of the optical elements 22.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a magnetic head configured to write data on the magnetic disk;
an assist section configured to assist, when the magnetic head writes data on the magnetic disk, write of the data by utilizing an assist element;
a voltage control section configured to control a voltage to be applied to the assist element;
a positioning control section configured to carry out positioning of the magnetic head relatively to the magnetic disk on the basis of servo data and acquire positional error data of the magnetic head positioned on the basis of the servo data; and
a voltage adjustment control section configured to adjust the magnitude of the voltage to be applied to the assist element by the voltage control section when the positional error data exceeds a predetermined value, wherein
the voltage adjustment control section adjusts the magnitude of the voltage of the voltage control section on the basis of the positional error data in such a manner as to make the voltage to be applied to the assist element smaller as the positional error becomes greater, and
an amount by which the voltage to be applied to the assist element is made smaller is determined on the basis of a tendency of an average element lifetime relative to the voltage to be applied to the assist element.

2. The magnetic disk device of claim 1, wherein
the assist element is a spin-torque oscillator element configured to oscillate high-frequency waves, and
the assist section is a high-frequency assist section configured to assist write of data by using the spin-torque oscillator element.

3. The magnetic disk device of claim 1, wherein
the assist element is an optical element configured to emit laser light, and
the assist section is a thermal assist section configured to assist write of data by using the optical element.

4. A magnetic disk device of claim 2, wherein comprising:
a magnetic disk;
a magnetic head configured to write data on the magnetic disk;
an assist section configured to assist, when the magnetic head writes data on the magnetic disk, write of the data by utilizing an assist element;
a voltage control section configured to control a voltage to be applied to the assist element;
a positioning control section configured to carry out positioning of the magnetic head relatively to the magnetic disk on the basis of servo data and acquire positional error data of the magnetic head positioned on the basis of the servo data; and
a voltage adjustment control section configured to adjust the magnitude of the voltage to be applied to the assist element by the voltage control section when the positional error data exceeds a predetermined value, wherein
when the voltage to be applied to the assist element of the magnetic head in which the variance value of the positional error data is the smallest is set as a first voltage, and the voltage to be applied to the assist element of the magnetic head in which the variance value of the positional error data is the largest is set as a second voltage,
the voltage adjustment control section adjusts the magnitude of the voltage to be applied to the assist element by the voltage control section in such a manner that the first voltage becomes greater than or equal to the second voltage.

5. The magnetic disk device of claim 4, wherein
the assist element is a spin-torque oscillator element configured to oscillate high-frequency waves, and
the assist section is a high-frequency assist section configured to assist write of data by using the spin-torque oscillator element.

6. The magnetic disk device of claim 4, wherein
the assist element is an optical element configured to emit laser light, and
the assist section is a thermal assist section configured to assist write of data by using the optical element.

7. A magnetic disk device comprising:
a magnetic disk;
a magnetic head configured to write data on the magnetic disk;
an assist section configured to assist, when the magnetic head writes data on the magnetic disk, write of the data by utilizing an assist element;
a voltage control section configured to control a voltage to be applied to the assist element;
a positioning control section configured to carry out positioning of the magnetic head relatively to the magnetic disk on the basis of servo data and acquire positional error data of the magnetic head positioned on the basis of the servo data; and
a voltage adjustment control section configured to adjust the magnitude of the voltage to be applied to the assist element by the voltage control section when the positional error data exceeds a predetermined value,
which further comprising three or more sets of the magnetic disk and the magnetic head, wherein
the three or more sets are accommodated in a housing including a top cover and a base, and
when an average value of the voltage to be applied to the assist element of the magnetic head closest to the top cover side and the voltage to be applied to the assist element of the magnetic head closest to the base side is set as a third voltage, and an average value of the voltages to be applied to the assist elements of the magnetic heads other than the magnetic heads closest to the top cover side and the base side is set as a fourth voltage, the voltage adjustment control section adjusts the magnitude of the voltage to be applied to each of the assist elements by the voltage control section in such a manner that the fourth voltage becomes greater than or equal to the third voltage.

8. The magnetic disk device of claim 7, wherein the assist element is a spin-torque oscillator element configured to oscillate high-frequency waves, and the assist section is a high-frequency assist section configured to assist write of data by using the spin-torque oscillator element.

9. The magnetic disk device of claim 7, wherein the assist element is an optical element configured to emit laser light, and the assist section is a thermal assist section configured to assist write of data by using the optical element.

\* \* \* \* \*